Patented Nov. 14, 1922.

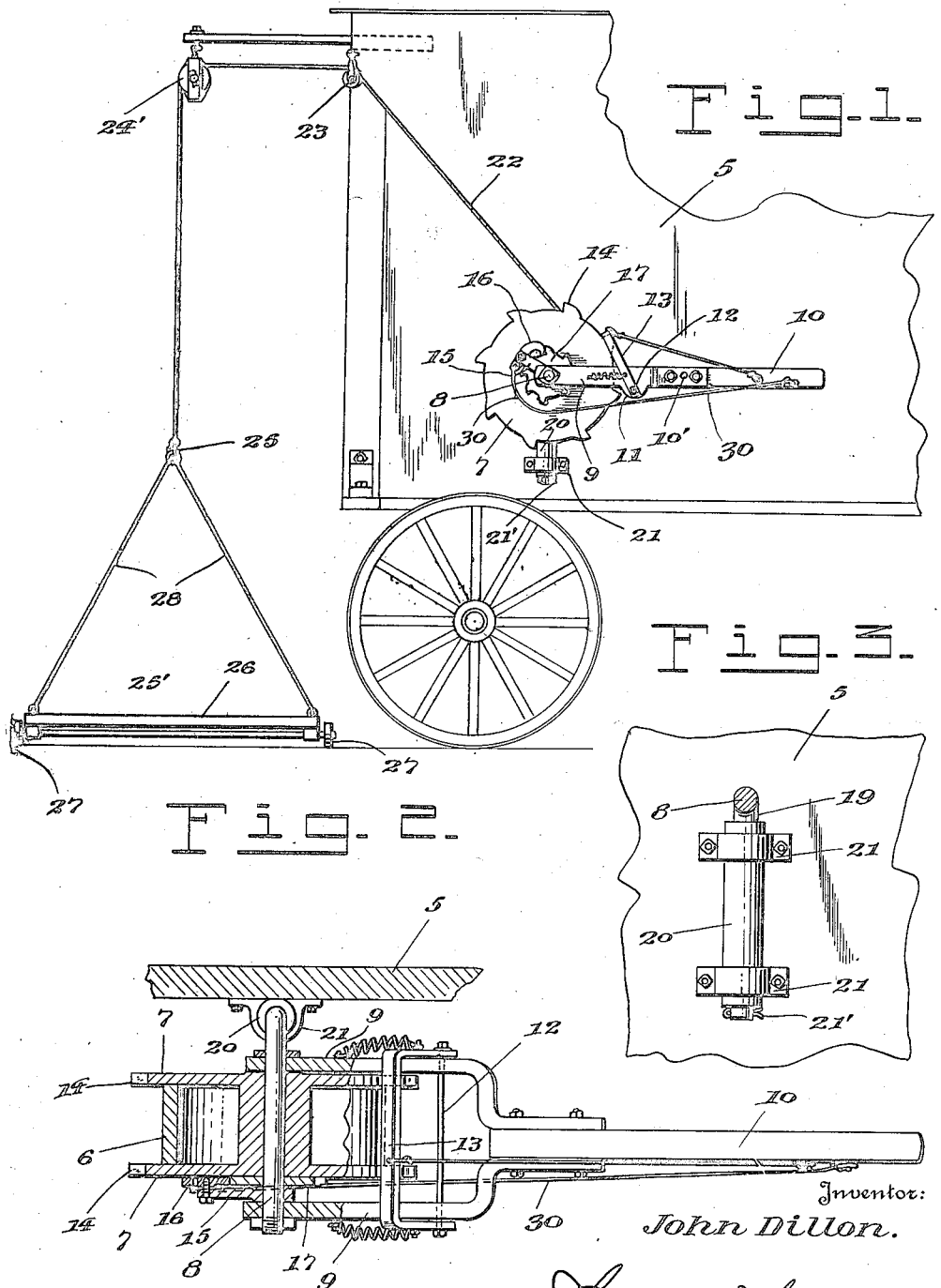

1,435,820

UNITED STATES PATENT OFFICE.

JOHN DILLON, OF NEW YORK, N. Y.

LOADING AND UNLOADING DEVICE.

Application filed March 3, 1921. Serial No. 449,293.

*To all whom it may concern:*

Be it known that I, JOHN DILLON, a citizen of the United States, residing at New York city, in the county of New York, State of New York, have invented certain new and useful Improvements in Loading and Unloading Devices; and I do hereby declare the following to be a full, clear, and exact description of the invention, such as will enable others skilled in the art to which it appertains to make and use the same.

This invention relates generally to loading and unloading devices, being particularly adaptable for use in connection with trucks or railway cars and providing means of simple and improved construction for facilitating the loading and unloading operations thereof.

A further object of the invention is to provide means of the character stated which may be easily and quickly applied to and removed from the vehicle, and by the use of which heavy weights and objects may be easily handled with the exercise of a minimum amount of physical force.

A still further object is to provide a device of the character stated which shall be of simple construction and composed of but few parts, the said parts being of strong construction and assemblage whereby danger of breakage or derangement thereof is obviated, which is easy of operation, and which may be purchased and maintained at small cost.

With these objects in view, together with others which will appear as the description proceeds, the invention consists in the novel construction, combination and arrangement of parts, all as will be described more fully hereinafter, illustrated in the drawings, and particularly pointed out in the claims.

In the drawings:

Figure 1 is a side elevation of a vehicle of conventional design and illustrating the application thereto of a loading and unloading device constructed in accordance with the invention.

Figure 2 is a horizontal section taken through the windlass device, illustrating the manner in which the same is constructed and the manner in which a driving connection between the lever and the drum is established.

Figure 3 is a detail view illustrating the windlass supporting device and the manner in which the same is attached to its support.

Referring now more particularly to the drawings, 5 indicates generally the vehicle, the same being a conventional design and shown merely for the purpose of illustrating the application of my invention thereto.

The windlass or elevating device is shown as comprising a wheel, the central portion of which constitutes a drum 6 to which a draft cable is to be attached, and the ends of the drum are enlarged so as to provide annular flanges 7. The drum is rotatably mounted upon a suitable spindle 8 and between the spaced bars 9 which constitute a part of the means by which the drum is actuated. The spaced bars are provided at their inner ends with openings as shown to aline with the bore of the drum to receive the spindle 8, said bars extending outwardly from the spindle in spaced parallel relation and are secured at their outer ends to the opposing sides of a handle or lever 10. If desired, the said spaced bars may be provided with longitudinal series of spaced openings 10′ in order that the handle or lever 10 may be adjusted.

The bars 9 are provided inwardly from their ends with ears 11, adapted to receive a pin 12 passing through suitable openings in the inner ends of the pawl member 13. This pawl member is of substantially U-shape, the bight portion of which rests upon the peripheries of the annular flanges 7 and is adapted to engage with the teeth 14 arranged in spaced relation upon the spaced peripheries. It will be observed that when the lever is moved in one direction the bight portion of the pawl 13 will engage the teeth 14 and thus lock the lever with the drum, while movement of the lever in the opposite direction will cause the said pawl to slide or play loosely over the said teeth.

The spindle 8 has an arm 15 rigidly secured thereto and extending radially therefrom and to the outer end of this arm is secured a dog 16 to engage with the teeth of a ratchet wheel 17 secured to the drum. It will be observed that the teeth of this ratchet wheel are disposed to extend in the same direction as the teeth 14 of the drum and it is obvious that the pawl 16 will permit the drum to rotate only in one direction.

The spindle 8 is provided at one end with a downwardly extending portion 19 constituting a support, and this support is designed to fit into a sleeve 20 secured as at 21 to the side of the vehicle. The support 19 is capable of sliding freely in the sleeve and may have limited rotation therein whereby liberal adjustment of the windlass device relative to the vehicle body may be made. The lower end of the support 19 has a locking pin 21' passing therethrough to prevent the same becoming accidently disengaged from its supporting members.

The cable 22 which is secured at one end to the drum 6, passes from the latter and over a guide pulley or sheave 23 attached to a suitable support above the bottom of the vehicle body, in the present instance said pulley being attached to the roof or upper part of the vehicle. The cable passes on from the said pulley and over a sheave 24' arranged in the upper portion of the vehicle body near one end thereof. The free end of the cable is provided with a hook 25 to be engaged with a sling, basket, truck or other container constituting a lift. This container is indicated at 25', and in the present instance, comprises a truck including a platform 26 supported upon rollers 27, wires, cables or ropes 28 being secured to the ends of the said truck and constituting a sling to be engaged by a hook at the free end of the cable.

Assuming that it is desired to load a vehicle with heavy articles, the said articles are placed upon the truck and the latter wheeled to a position directly beneath the free end of the cable. The hook of the latter will be engaged in the sling of the truck, and the pawl member 13 is moved so that the bight portion thereof rests upon the peripheries of the drum flanges. Reciprocating movement then applied to the lever will cause the cable to be wound upon the drum, it being understood that movement of the lever in one direction will cause a positive connection between the lever and the drum to be established, while movement of the lever in the opposite direction will be unimpeded; the pawl or dog 16 holding the drum against retrograde movement while the lever pawl is obtaining a fresh hold. This operation continues until the lift reaches the desired elevation, whereupon the articles thereon may be either removed from the truck and placed in the vehicle or the truck may be rolled upon the floor of the vehicle to that part thereof where it is desired to deposit the articles contained thereon.

Unloading of the vehicle is accomplished by reversing the operation, and in order that the drum may be set free at any time upon its spindle, the dog 16 has a wire 30 attached thereto and disposed within convenient reach of the lever operator. This wire may be actuated to move the pawl into or out of engagement with the ratchet wheel 17 as is obvious.

From the foregoing it is obvious that I have provided mechanism which is fully capable of attaining the ends set forth. For purposes of illustration the device is shown as used in connection with the loading and unloading of vehicles, but it will be understood that the invention is not to be limited to such use. A device of such character is readily adaptable for use in warehouses and other storage places where it is required to lift and transport heavy weights and objects and such functions may be quickly attained by using the device of my invention with the expenditure of but a small amount of physical energy. I also reserve the right to resort to variations in the structure and assemblage of the parts, as it is obvious that liberal changes of such nature may be resorted to without departing from the invention as defined by the claim.

What is claimed is:

In a device of the class described, a spindle, an angularly disposed support at one end of said spindle, a sleeve to receive and maintain said support, a drum on said spindle, levers pivoted upon said spindle one upon each side of said drum, a handle connecting the outer ends of said levers beyond said drum, teeth on the periphery of said drum, a U-shape pawl pivoted at its ends to said levers, the bight portion of said pawl adapted to engage the teeth of said drum, a ratchet wheel carried by the drum, a pawl engaged with the teeth of said ratchet wheel, and a cable secured to said drum.

In testimony whereof, I affix my signature, in the presence of two witnesses.

JOHN DILLON.

Witnesses:
ADOLPH G. SEILER,
ELIZABETH F. McDERMOTT.